(12) United States Patent
Heacock

(10) Patent No.: US 11,445,804 B1
(45) Date of Patent: Sep. 20, 2022

(54) SYSTEM AND METHOD FOR A HAIR COLLECTION DEVICE WHICH RELEASES STORED HAIR WHEN ACTIVATED

(71) Applicant: SHOWERBUN LLC, Lakeland, FL (US)

(72) Inventor: Justin Heacock, Lakeland, FL (US)

(73) Assignee: SHOWERBUN, LLC, Lakeland, FL (US)

( * ) Notice: Subject to any disclaimer, the term of this patent is extended or adjusted under 35 U.S.C. 154(b) by 207 days.

(21) Appl. No.: 16/994,231

(22) Filed: Aug. 14, 2020

Related U.S. Application Data

(60) Provisional application No. 62/887,574, filed on Aug. 15, 2019.

(51) Int. Cl.
*A45D 44/16* (2006.01)
*F16B 47/00* (2006.01)

(52) U.S. Cl.
CPC .............. *A45D 44/16* (2013.01); *F16B 47/00* (2013.01)

(58) Field of Classification Search
CPC ...................................................... A45D 44/16
USPC ............................................ 4/654, 619, 680
See application file for complete search history.

(56) References Cited

U.S. PATENT DOCUMENTS

| | | | |
|---|---|---|---|
| 4,418,432 A | 12/1983 | Vidal | |
| 4,671,976 A * | 6/1987 | Vidal | E03C 1/264 4/293 |
| 5,462,018 A * | 10/1995 | Louison | A01K 13/001 119/626 |
| 7,407,142 B1 | 8/2008 | Lopez | |
| 8,857,011 B2 * | 10/2014 | Casper | A47L 9/1409 15/396 |
| 10,219,606 B1 * | 3/2019 | Boncimino | A45D 44/16 |
| 10,791,819 B2 * | 10/2020 | Caccamise | A45D 44/16 |
| 2004/0047674 A1 * | 3/2004 | Geardino | B05C 17/002 401/196 |
| 2005/0223481 A1 | 10/2005 | Giacomi | |
| 2011/0308035 A1 * | 12/2011 | Casper | A47L 9/1683 15/344 |
| 2016/0309886 A1 | 10/2016 | Oldham | |
| 2018/0064233 A1 * | 3/2018 | Riley | A46B 17/02 |

FOREIGN PATENT DOCUMENTS

AU 2013/100076 3/2013

\* cited by examiner

*Primary Examiner* — Lori L Baker
(74) *Attorney, Agent, or Firm* — Terry M. Sanks, Esq.; Buesse Sanks, PLLC

(57) ABSTRACT

A hair storage system includes a base with a bottom side configured to attach to an external surface, the bottom side is configured to move when pressure is applied. A movable collection surface is provided with a plurality of holes formed therethrough. The movable collection surface is movable from a first location proximate to a top side of the base and a second location further away from the top side of the base and a plurality of protrusions. Each respective protrusion has a respective base end and a respective terminal end with the terminal ends extending through the plurality of holes of the movable collection surface. Once hair is stored within the plurality of protrusions, movement of the movable collection surface from the first location to the second location releases the hair from the plurality of protrusions.

19 Claims, 4 Drawing Sheets

SYSTEM AND METHOD FOR A HAIR COLLECTION DEVICE WHICH RELEASES STORED HAIR WHEN ACTIVATED

CROSS-REFERENCE TO RELATED APPLICATIONS

This application claims the benefit of U.S. Provisional Application No. 62/887,574 filed Aug. 15, 2020, and incorporated herein by reference in its entirety.

BACKGROUND

Embodiments relate to collection apparatus and, more particularly, to a hair collection device that captures hair at a bathing area and is operable to assist in removing collected hair from the hair collection device.

Individuals shedding hair is a natural occurrence. A common place where hair is shedded is when bathing, such as in a shower or bathtub. Shedding usually occurs more while bathing as water may be applied to the hair while cleaning such as, at a minimum, having water from a showerhead impeding upon a person's head or where there is a focus on cleaning the hair such as the application and removal of shampoo from the individual's hair which involves both an application of water and the use of an individual's hands.

While short hair may more easily flow with water down a drain when shedding occurs, long hair provides a different challenge. Over a period of time shedded hair can result in poor drain performance precipitating the requirement for plumbing repairs and/or maintenance.

Generally, individuals who are conscious of issues with hair interfering with plumbing will attempt to collect hair while showering or bathing. Some individuals will collect the shedded hair strands during the bathing process, but often find that maintaining the collection of hair in an organized manner for subsequent disposal difficult.

Though hair collection devices are known in the prior art, limitations exist with them. A primary limitation is that once hair is captured by prior art hair collection devices, removing hair from the prior art collection devices is difficult.

Users of hair collection devices who seek to capture shedded hair would benefit from a system used in a bathing area that not only provides for collecting shedded hair, but also provides for removing collected hair with minimum difficulty.

SUMMARY

Embodiments relate to a system and method to store shedded hair and provides for removing the shedded hair from the system. The hair storage system comprises a base with a bottom side configured to attach to an external surface, the bottom side is configured to move when pressure is applied. The system also comprises a movable collection surface with a plurality of holes formed therethrough, the movable collection surface is movable from a first location proximate to a top side of the base and a second location further away from the top side of the base. The system further comprises a plurality of protrusions, each respective protrusion having a respective base end and a respective terminal end with the terminal ends extending through the plurality of holes of the movable collection surface. Once hair is stored within the plurality of protrusions, movement of the movable collection surface from the first location to the second location releases the hair from the plurality of protrusions.

Another embodiment of the system comprises a moveable two-layer structure to store and release collected hair, the movable two-layer structure having a top layer, the top layer comprising a plurality of openings formed therethrough, and a second layer, the second layer having an opening formed therethrough, wherein the top layer and the second layer are separated.

The system further comprises a base having a top side and a bottom side, the base is attachable to an external surface at the bottom side, the base is configured to move when pressure is applied at a location on the bottom side. The system also comprises a connector extending from the base, through the opening of the second layer to the top layer of the moveable two-layer structure and a plurality of protrusions extending from the second layer through the plurality of openings of the first layer. Pressure applied to the location on the bottom side of the base causes the top layer of the moveable two-layer structure to move in response to the pressure applied to provide for the movement of the top layer to cause stored hair to move from within the plurality of protrusions.

The method comprises applying pressure at a location on a base of the hair storage device. The method also comprises activating a connector extending from the base to a movable collection surface to cause the movable collection surface to move away from the base. The method further comprises moving the movable collection surface to rise towards respective ends of a plurality of protrusions that pass through a plurality of openings formed therethrough the movable collection surface to cause hair stored by the plurality of protrusions to disengage from the plurality of protrusions.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
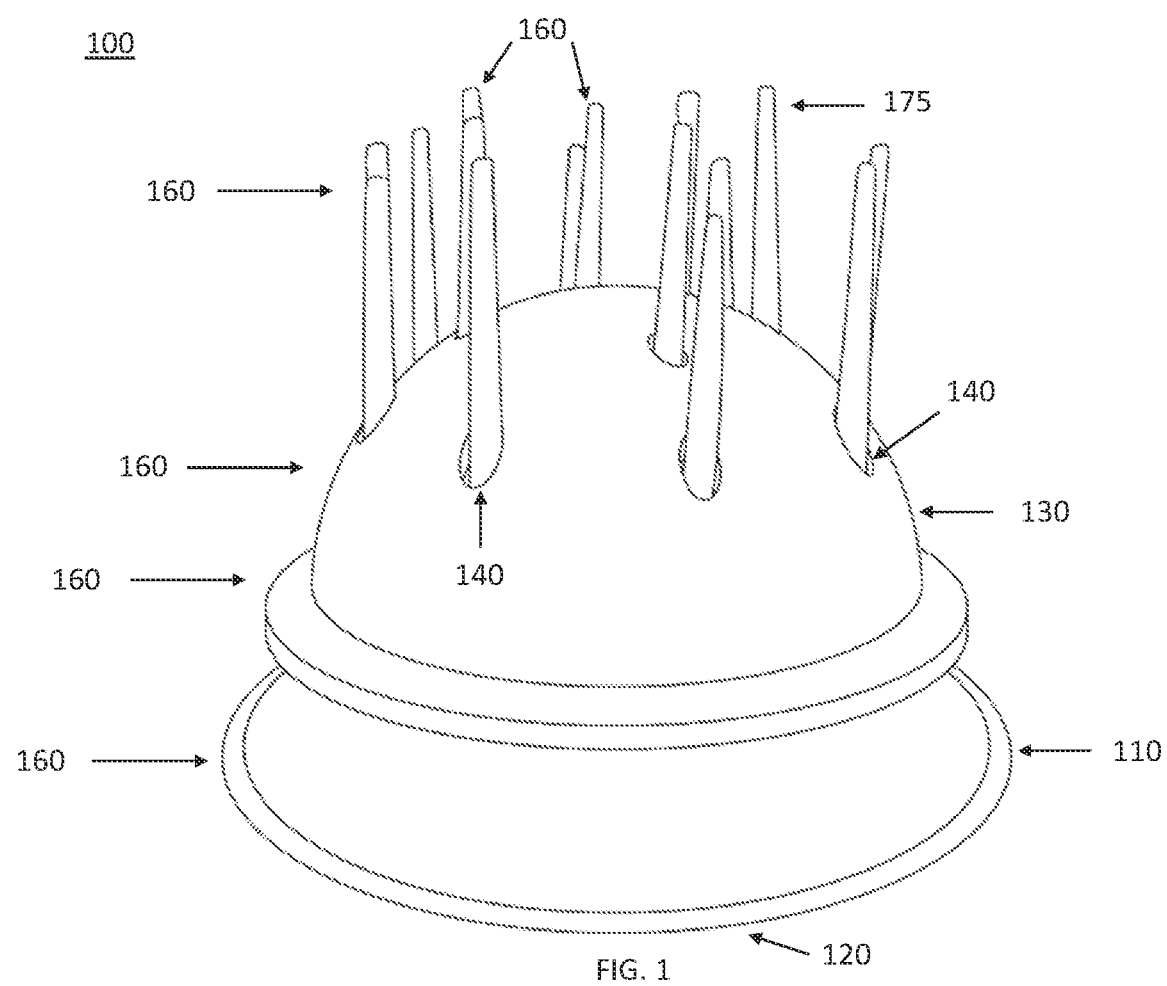
FIG. 1 shows an embodiment of a hair collection device in accordance with embodiments disclosed herein.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5x to 2x, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

FIG. 1 shows an embodiment of a hair collection device in accordance with embodiments disclosed herein. FIG. 1 shows an arrangement where the hair collection device is arranged to receive shedded hair. As shown, the hair collection device 100 has a base 110. The base 110 has a bottom side 120 configured to attach to an external surface such as, but not limited to, a wall in a shower. The bottom side 120 is configured to move when pressure is applied. As a non-limiting example, as shown, the base 110 and bottom side 120 may be a suction cup device. Though not shown, other attachment elements may be used to attach the base 110 to the external surface. While a suction cup is pliable to move when pressure is applied to the bottom side 120, when a suction cup arrangement is not used, another element such as, but not limited to, a button device may be provided.

A movable collection surface 130 with a plurality of holes 140 formed therethrough is provided. The movable collection surface 130 is movable from a first location proximate to a top side of the base 110 and a second location further away from the top side of the base 110. FIG. 1 shows the movable collection surface 130 at the first location.

A plurality of protrusions 160 are also provided. The protrusions 160 may also be considered bristles or extensions. Each respective protrusion has a respective base end and a respective terminal end 175 with the terminal ends extending through the plurality of holes 140 of the movable collection surface 130. In operation, as disclosed in further detail below, once hair is stored within the plurality of protrusions 160, movement of the movable collection surface 130 from the first location (shown in FIG. 1) to the second location (shown in FIG. 2) releases the hair from the plurality of protrusions 160.

The plurality of protrusions 160 may be arranged so that a human finger may enter between a space between adjacent protrusions. Thus, as a non-limiting example, there may be at least four (4) centimeters (cm), plus or minus three (3) cm, between adjacent protrusions. Furthermore, the plurality of protrusions may be made from a pliable material to provide for movement when a human finger, or another elongated device, is placed between at least two adjacent protrusions. Non-limiting examples of the pliable material comprise flexible plastics, silicon, or any other strong but bendable material.

The hair collection device 100 may comprise any shape or geometric shape. Non-limiting examples include, but is not limited to, a circular, square, rectangular, octagonal, hexagonal arrangement. Thus, at least one of the base and the movable collection surface may comprise such a non-limiting shape. As a further non-limiting example, when the movable collection surface comprises a circular arrangement, the plurality of protrusions may be arranged in at least two circular rows. When another shape is used, the plurality of protrusions may be arranged in at least two rows representative of the shape selected.

Figure 2:
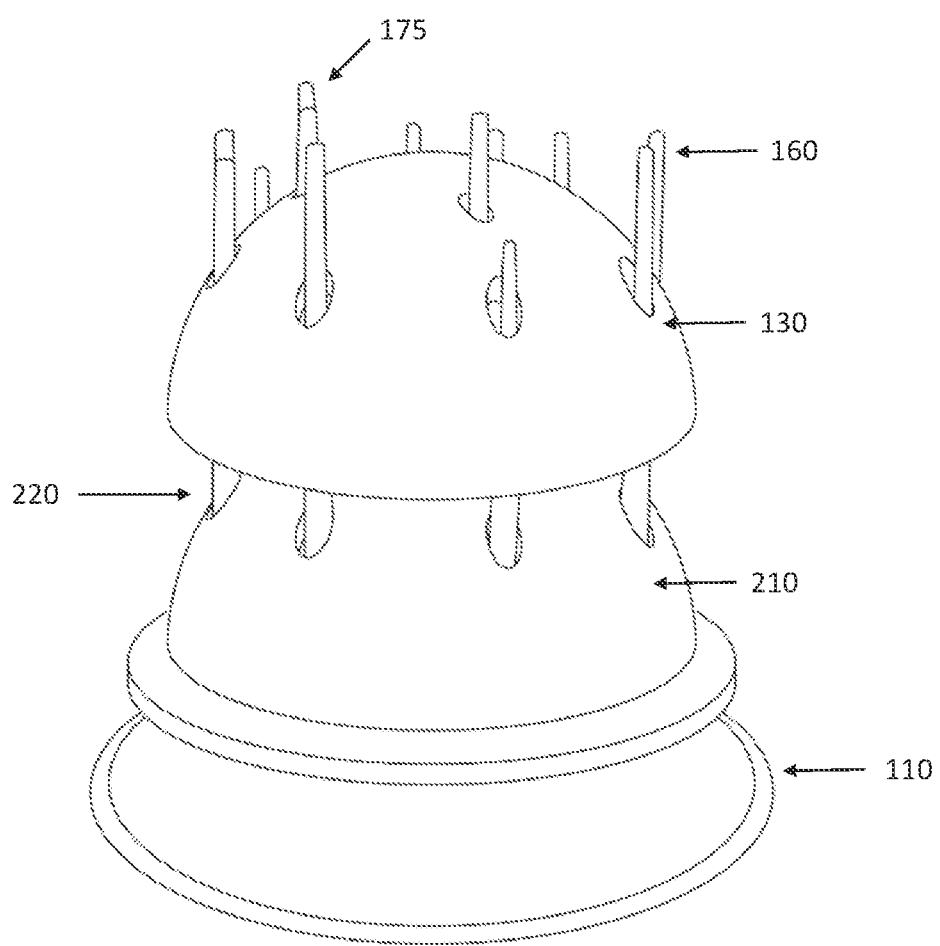
FIG. 2 shows an embodiment in an arrangement to assist with removing hair from embodiments disclosed herein.

FIG. 2 shows an embodiment in an arrangement to assist with removing hair from embodiments disclosed herein. As discussed above, this arrangement may be considered the second location. As shown, a top part of the movable collection surface 130 may be at the second position which is further away from the base 110, when compared to the first position, and closer to the terminal ends 175 of the protrusions 160. Moving the movable collection surface 130 towards the terminal ends 175 provides for the stored hair being released from the device 100.

In an embodiment, a protrusion connection member 210 may be provided and may be located between the base 110 and the movable collection surface 130 to which the plurality of protrusions 160 is attached at their respective base ends 220 to the bristle connection member 210. The base ends 220 may be attached to a top surface of the protrusion connection member 210 or to a bottom surface. When attached to the bottom surface, a plurality of openings are provided through which the plurality of protrusions pass. In another embodiment, the plurality of protrusions 160 are instead attached at their respective base ends 220 to a top side of the base 110 and the protrusion connection member 210 may or may not be included. If the protrusion connection member 210 is included, it stabilizes the plurality of protrusions when the movable collection surface is moved.

Figure 3:
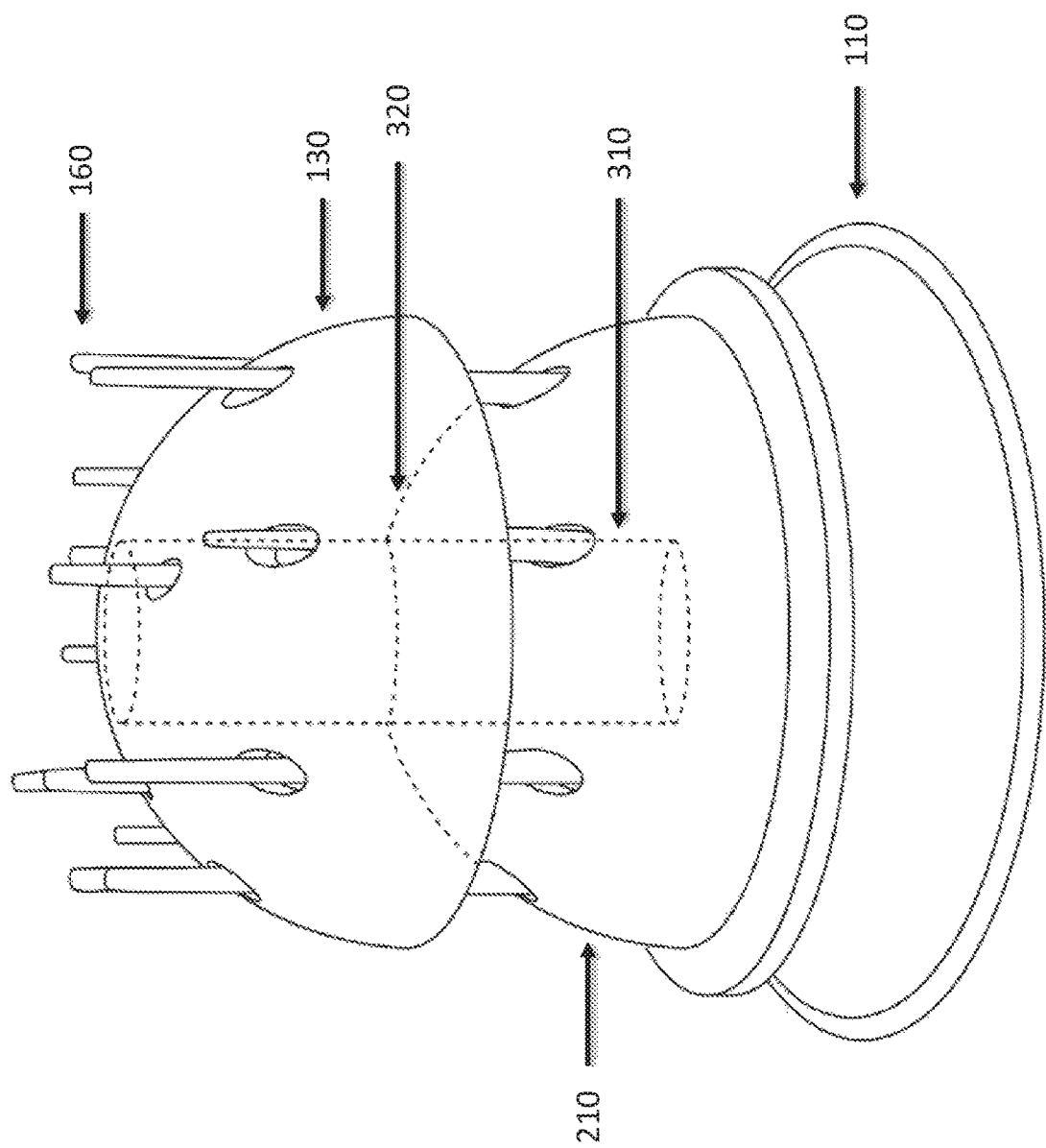
FIG. 3 shows an embodiment of an internal view of the hair collection device.

FIG. 3 shows an embodiment of an internal view of the hair collection device. As shown a connector 310 may be provided connecting the base 110 to the movable collection surface 130. The connector 310 may be a cylinder that is connected to the movable collection surface 130 at a first end and to the base 110 at a second end. When pressure is applied at the bottom side 120 of the base 110, in an area where the cylinder terminates, the pressure causes the cylinder 310 to move away from the pressure, resulting in the movable collection surface 130 to move away from the base 110, hence moving from the first location to the second location. As discussed above, though the protrusion connection member 210 is shown, depending on the embodiment, it is not needed.

In a non-limiting example, the movable collection device 130 and the protrusion connection member 210 may be considered a moveable two-layer structure. The two-layer structure 130, 210 may be arranged to store and release collected hair. The movable two-layer structure may have a top layer 130 where the top layer 130 has a plurality of openings 140 formed therethrough. As discussed further herein, the plurality of openings 140 are provided for a plurality of protrusions 160 to pass through. The movable two-layer structure also has the second layer 210. The second layer 210 may be non-movable. The base end 220 of the protrusions 160 of the plurality of protrusions may be attached to the second layer 210. As shown in FIG. 3, the second layer 210 may have an opening 320, formed therethrough. The opening 320 may be provided for the connector 310, to pass through. Thus, movement of the connector 310 does not result in the second layer 210 moving. Hence, the plurality of protrusions 160 also are not moved when the connector 310 moves. Though the term "layer" is used, as shown, the top layer 130 and the second layer 210 may be separated from each other.

Figure 4:
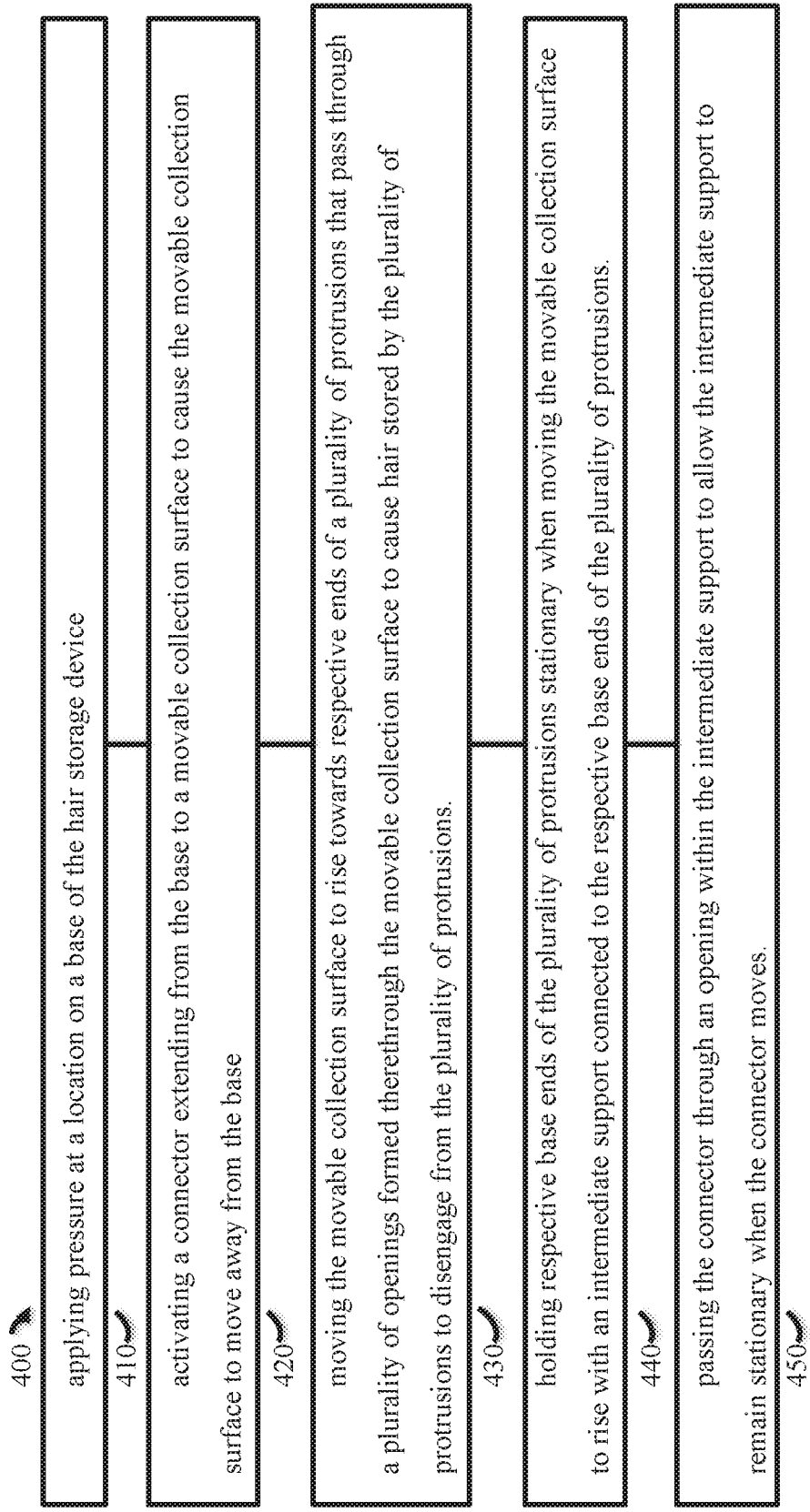
FIG. 4 shows a flowchart of an embodiment for hair collection device.

FIG. 4 shows a flowchart of an embodiment for hair collection device. The flowchart 400 comprises applying pressure at a location on a base of the hair storage device, at 410. The method 400 further comprises activating a connector extending from the base to a movable collection surface to cause the movable collection surface to move away from the base, at 420. The method 400 further comprises moving the movable collection surface to rise towards respective ends of a plurality of protrusions that pass through a plurality of openings formed therethrough the movable collection surface to cause hair stored by the plurality of protrusions to disengage from the plurality of protrusions, at 430.

The method 400 may further comprise holding respective base ends of the plurality of protrusions stationary when moving the movable collection surface to rise with an intermediate support connected to the respective base ends of the plurality of protrusions, at 440. The method 400 may also comprise passing the connector through an opening within the intermediate support to allow the intermediate support remain stationary when the connector moves, at 450.

Embodiments disclosed herein provide for a hair storage or collection device 100 with a moveable structure 160 to store and push hair out from the collection device for a user. A moveable connector 310 such as, but not limited to, a cylinder, allows for at least a part of the movable structure 130 to be pushed up to the top of bristles or protrusions 160 ejecting the hair off the device 100. There is a base 110 where the push is initiated resulting in the movable collection surface 160 to move away from the base 110 and allows the device to be mounted to the shower wall.

Thus, the embodiments disclosed herein seek to provide a hair storage device with a movable structure, which may be a moveable two-layer structure, to store and push hair out for a user. This functionality is created by a connector, that may be a middle cylinder, that connects a top layer of the movable structure to a base on the bottom-most of the device. When pressure is applied to the bottom of the base, the connector causes the top layer to move away from the base. When the movable structure comprises the two-layer structure, the connector is not connected to the lower layer and hence does not cause the lower layer to move when the connector moves the top layer away from the base. To create the self-cleaning functionality the user may press the suction cup at a location the cylinder is connected to the base. This will push the top layer of the device or the movable structure up to the top part of the bristles or protrusions, thus pushing the hair off the device.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another. As used herein the expression "at least one of A and B," will be understood to mean only A, only B, or both A and B.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

I claim:

1. A hair storage system, comprising:
   a base with a bottom side configured to attach to an external surface, the bottom side is configured to move when pressure is applied;

a movable collection surface with a plurality of holes formed therethrough, the movable collection surface is movable from a first location proximate to a top side of the base and a second location further away from the top side of the base; and a plurality of protrusions, each respective protrusion having a respective base end and a respective terminal end with the terminal ends extending through the plurality of holes of the movable collection surface;

wherein once hair is stored within the plurality of protrusions, movement of the movable collection surface from the first location to the second location releases the hair from the plurality of protrusions.

2. The system of claim 1, further comprising a protrusion connection member located between the base and the movable collection surface to which the plurality of protrusions is attached at their respective base ends to the protrusion connection member.

3. The system of claim 2, further comprising a connector that connects the movable collection surface to the base wherein pressure applied to the bottom of the base where the connector is attached causes the connector to push the movable collection surface to the second location which results in ejecting stored hair from the plurality of protrusions.

4. The system of claim 1, wherein the base comprises a suction element on the bottom side to at least one of attach to the external surface and to move when pressure is applied.

5. The system of claim 1, wherein the plurality of protrusions is arranged with at least four centimeters therebetween adjacent protrusions to provide space for a human finger to enter the space.

6. The system of claim 1, wherein the plurality of protrusions is attached at their respective base ends to a top side of the base.

7. The system of claim 6, further comprising a connector that connects the movable collection surface to the base wherein pressure applied to the bottom of the base where the connector is attached causes the connector to push the movable collection surface to the second location which results in ejecting stored hair from the plurality of protrusions.

8. The system of claim 1, wherein the plurality of protrusions is made from a pliable material to provide for movement when a human finger is placed between at least two adjacent protrusions.

9. The system of claim 1, wherein at least one of the base and the movable collection surface comprises a same geometric arrangement.

10. The system of claim 9, wherein when the movable collection surface comprises a circular arrangement, the plurality of protrusions is arranged in at least two circular rows.

11. A hair storage system, comprising:
a moveable two-layer structure to store and release collected hair, the movable two-layer structure having a top layer, the top layer comprising a plurality of openings formed therethrough, and a second layer, the second layer has an opening formed therethrough, wherein the top layer and the second layer are separated;

a base having a top side and a bottom side, the base is attachable to an external surface at the bottom side, the base is configured to move when pressure is applied at a location on the bottom side;

a connector extending from the base, through the opening of the second layer to the top layer of the moveable two-layer structure;

a plurality of protrusions extending from the second layer through the plurality of openings of the first layer;

wherein pressure applied to the location on the bottom side of the base causes the top layer of the moveable two-layer structure to move in response to the pressure applied to provide for the movement of the top layer to cause stored hair to move from within the plurality of protrusions.

12. The system of claim 11, wherein the base comprises a suction element on the bottom side to at least one of attach to the external surface and to move when pressure is applied.

13. The system of claim 11, wherein the plurality of protrusions is arranged with at least four centimeters therebetween adjacent protrusions to provide space for a human finger to enter the space.

14. The system of claim 11, wherein the plurality of protrusions is made from a pliable material to provide for movement when a human finger is placed with at least two adjacent protrusions.

15. The system of claim 11, wherein at least one of the base and the movable two-layer structure comprises a same geometric arrangement.

16. The system of claim 15, wherein when the movable two-layer structure comprises a circular arrangement, the plurality of protrusions are arranged in at least two circular rows.

17. A method for removing hair from a hair storage device, the method comprising:
applying pressure at a location on a base of the hair storage device;
activating a connector extending from the base to a movable collection surface to cause the movable collection surface to move away from the base; and
moving the movable collection surface to rise towards respective ends of a plurality of protrusions that pass through a plurality of openings formed therethrough the movable collection surface to cause hair stored by the plurality of protrusions to disengage from the plurality of protrusions.

18. The method according to claim 17, further comprising holding respective base ends of the plurality of protrusions stationary when moving the movable collection surface to rise with an intermediate support connected to the respective base ends of the plurality of protrusions.

19. The method according to claim 17, further comprising passing the connector through an opening within the intermediate support to allow the intermediate support remain stationary when the connector moves.

* * * * *